United States Patent
Xiang et al.

(10) Patent No.: US 9,755,375 B2
(45) Date of Patent: Sep. 5, 2017

(54) FLAT PANEL DISPLAY SUPPORT WITH A BASE WITH A USB ON ITS SIDEWALL

(71) Applicant: LOCTEK VISUAL TECHNOLOGY CORP., Ningbo, Zhejiang (CN)

(72) Inventors: Lehong Xiang, Ningbo (CN); Qiang Chen, Ningbo (CN)

(73) Assignee: LOCTEK VISUAL TECHNOLOGY CORP., Ningbo (CN)

( * ) Notice: Subject to any disclaimer, the term of this patent is extended or adjusted under 35 U.S.C. 154(b) by 0 days.

(21) Appl. No.: 15/116,649

(22) PCT Filed: Jan. 28, 2015

(86) PCT No.: PCT/CN2015/071736
§ 371 (c)(1),
(2) Date: Aug. 4, 2016

(87) PCT Pub. No.: WO2015/161695
PCT Pub. Date: Oct. 29, 2015

(65) Prior Publication Data
US 2016/0352054 A1  Dec. 1, 2016

(30) Foreign Application Priority Data
Apr. 24, 2014  (CN) .......................... 2014 1 0165998

(51) Int. Cl.
*H01R 13/60* (2006.01)
*H01R 13/66* (2006.01)
(Continued)

(52) U.S. Cl.
CPC ............. *H01R 13/73* (2013.01); *A47B 97/00* (2013.01); *F16M 11/06* (2013.01); *F16M 11/12* (2013.01);
(Continued)

(58) Field of Classification Search
CPC ........ H01R 13/60; H01R 13/73; H01R 24/58; H01R 27/02; H01R 24/64
(Continued)

(56) References Cited

U.S. PATENT DOCUMENTS

| 7,593,220 B2* | 9/2009 | Proctor | ..................... H04R 3/00 361/679.23 |
| 8,998,462 B2* | 4/2015 | Chien | ..................... F21V 17/02 362/249.02 |

(Continued)

FOREIGN PATENT DOCUMENTS

| CN | 101047043 | 10/2007 |
| CN | 101495707 | 7/2009 |

(Continued)

OTHER PUBLICATIONS

English translation of International search report dated May 6, 2015 from PCT/CN2015/071736.*
(Continued)

*Primary Examiner* — Chandrika Prasad
(74) *Attorney, Agent, or Firm* — Hauptman Ham, LLP

(57) ABSTRACT

The present invention discloses a flat panel display support, which includes a base, a first connecting lever, a second connecting lever and a first display mounting plate; one end of the first connecting lever is rotationally connected with the base, the other end of the first connecting lever is rotationally connected with one end of the second connecting lever, the other end of the second connecting lever is rotationally connected with the first display mounting plate, and the base is provided with a USB interface, an audio output interface for connecting with an earphone or a speaker, and an audio input interface for connecting with a microphone. By adopting this structure, a user can directly plug devices, the earphone or the speaker with a USB into (Continued)

the base without stoop. The flat panel display support is simple and convenient, and user experience is good.

7 Claims, 2 Drawing Sheets

(51) Int. Cl.
| | | |
|---|---|---|
| H01R 13/73 | (2006.01) | |
| F16M 11/12 | (2006.01) | |
| F16M 13/02 | (2006.01) | |
| A47B 97/00 | (2006.01) | |
| F16M 11/06 | (2006.01) | |
| F16M 11/20 | (2006.01) | |
| H01R 24/58 | (2011.01) | |
| H01R 24/64 | (2011.01) | |
| H01R 27/02 | (2006.01) | |
| H05K 5/00 | (2006.01) | |
| G06F 1/16 | (2006.01) | |
| H01R 107/00 | (2006.01) | |

(52) U.S. Cl.
CPC ........ *F16M 11/2007* (2013.01); *F16M 13/02* (2013.01); *F16M 13/022* (2013.01); *G06F 1/16* (2013.01); *H01R 24/58* (2013.01); *H01R 24/64* (2013.01); *H01R 27/02* (2013.01); *H05K 5/0017* (2013.01); *A47B 2097/005* (2013.01); *H01R 2107/00* (2013.01)

(58) Field of Classification Search
USPC ....... 439/529; 248/176.3, 276.1; 361/679.22, 361/679.59
See application file for complete search history.

(56) References Cited

U.S. PATENT DOCUMENTS

| | | | | |
|---|---|---|---|---|
| 2003/0063432 | A1* | 4/2003 | Farrow | G06F 1/1601 361/679.02 |
| 2007/0252919 | A1* | 11/2007 | McGreevy | F16M 11/10 348/825 |
| 2012/0127708 | A1* | 5/2012 | Chien | F21V 17/02 362/234 |
| 2014/0243849 | A1* | 8/2014 | Saglam | A61B 19/2203 606/130 |
| 2015/0274296 | A1* | 10/2015 | Zimmermann | B64D 11/06 361/679.56 |
| 2016/0153650 | A1* | 6/2016 | Chien | F21V 33/0004 362/253 |

FOREIGN PATENT DOCUMENTS

| | | |
|---|---|---|
| CN | 201526786 | 7/2010 |
| CN | 102242858 | 11/2011 |
| CN | 102620125 | 8/2012 |
| CN | 103062602 | 4/2013 |
| CN | 202901738 | 4/2013 |
| CN | 203363578 | 12/2013 |
| CN | 103953831 | 7/2014 |
| CN | 203979804 | 12/2014 |
| WO | 2008134754 | 11/2008 |

OTHER PUBLICATIONS

English translation of Lehong ( CN 203363578) published Dec. 25, 2013.*
International search report dated May 6, 2015 from corresponding No. PCT/CN2015/071736.

* cited by examiner

FLAT PANEL DISPLAY SUPPORT WITH A BASE WITH A USB ON ITS SIDEWALL

RELATED APPLICATIONS

The present application is a National Phase of International Application Number PCT/CN2015/071736, filed Jan. 28, 2015, and claims the priority of China Application No. 201410165998.0, filed Apr. 24, 2014, which are incorporated herein by reference in their entireties.

TECHNICAL FIELD

The present invention relates to a flat panel display support for a flat panel display.

BACKGROUND ART

Currently, since the display installation at a fixed place on a desktop cannot meet people's requirements in the daily life such as at work and study, there are an increasing number of display carrying devices comprising a base, a connecting lever and a display connecting plate etc. The display carry device is connected to the back of the display, and the display is allowed to freely rotate to adjust the positions of the display via a rotatable connection of the connecting lever.

The existing flat panel display support is generally not provided with a USB interface and an audio input interface and an audio output interface, so that users have to stoop down to perform the plug operations on a host computer when plugging in electronic products having USB interfaces, and it is also inconvenient to perform the plug operations on the host computer when plugging in earphones or a speaker, resulting in a poor user experience.

SUMMARY OF THE INVENTION

The technical problem to be solved by the present invention is to overcome the defects of the prior art, thus providing a flat panel display support having a USB interface, and easyly and conveniently for uses plugging in a speaker or earphones.

In order to solve the above problems, the present invention provides a flat panel display support which comprises a base, a first connecting lever, a second connecting lever and a first display mounting plate, wherein one end of the first connecting lever is rotationally connected to the base, the other end of the first connecting lever is rotationally connected to one end of the second connecting lever, and the other end of the second connecting lever is rotationally connected to the first display mounting plate, and the base is provided with a USB interface, an audio output interface for connecting with earphones or a speaker, and an audio input interface for connecting with a microphone.

The present invention has the following advantages by employing the above configuration: the flat panel display of this invention is additional provided with a USB interface, an audio input and output interfaces which are connected to the respective interfaces on a host computer, so that users can directly plug in devices having USB interfaces, earphones or a speaker without stoop. The flat panel display support is simple and convenient to use, and the user experience is good.

As an improvement, the flat panel display support further comprises a third connecting lever, a fourth connecting lever and a second display mounting plate, wherein one end of the third connecting lever is rotationally connected to the base, the other end of the third connecting lever is rotationally connected to one end of the fourth connecting lever, and the other end of the fourth connecting lever is rotationally connected to the second display mounting plate. Two flat panel displays may be connected simultaneously by employing such configuration.

The USB interface is one or more. Using a plurality of USB interfaces can expand the number of USB interfaces on the host computer.

Figure 1:
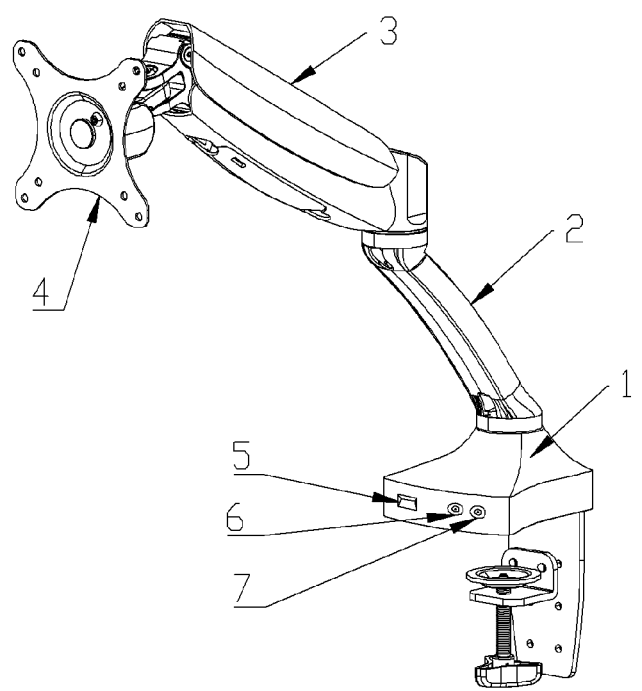
FIG. 1 is a schematic diagram of the configuration according to the present invention.

As shown in the drawings: a base (1), a first connecting lever (2), a second connecting lever (3), a first display mounting plate (4), a USB interface (5), an audio output interface (6), an audio input interface (7), a third connecting lever (8), a fourth connecting lever (9), a second display mounting plate (10).

DETAILED DESCRIPTION OF THE INVENTION

The present invention is further described in detail with reference to the drawings and embodiments.

Example 1

As shown in FIG. 1, a flat panel display support comprises a base 1, a first connecting lever 2, a second connecting lever 3 and a first display mounting plate 4, wherein, one end of the first connecting lever 2 is rotationally connected to the base 1, the other end of the first connecting lever 2 is rotationally connected to one end of the second connecting lever 3, the other end of the second connecting lever 3 is rotationally connected to the first display mounting plate 4, and the base 1 is provided with a USB interface 5, an audio output interface 6 for connecting with earphones or a speaker, and an audio input interface 7 for connecting with a microphone. This flat panel display support can support one flat panel display. The USB interface is connected to a USB male connector via a connecting wire, the USB male connector may be connected to a USB interface on a host computer, the audio output interface 6 and the audio input interface 7 are connected to two plugs via connecting wires, and the two plugs are connected to an audio output aperture and an audio input aperture, respectively.

In this example, there are one USB interface, one audio output aperture and one audio input aperture.

Example 2

Figure 2:
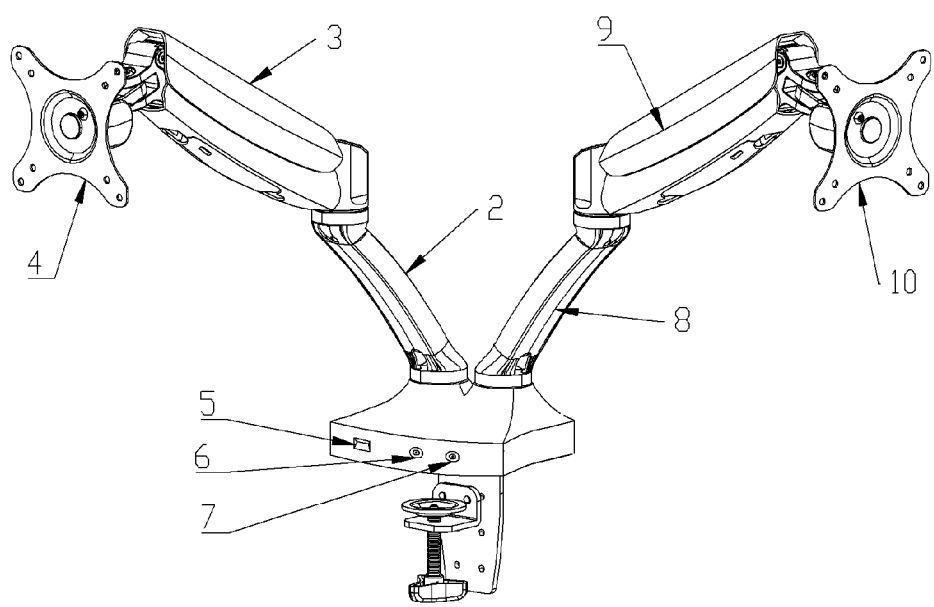
FIG. 2 is a schematic diagram of the configuration according to the second embodiment.

As shown in FIG. 2, a flat panel display support, comprises a base 1, a first connecting lever 2, a second connecting lever 3 and a first display mounting plate 4, wherein, one end of the first connecting lever 2 is rotationally connected to the base 1, the other end of the first c connecting lever 2 is rotationally connected to one end of the second connecting lever 3, and the other end of the second connecting lever 3 is rotationally connected to the first display mounting plate 4; the flat panel display support further comprises a third connecting lever 8, a fourth connecting lever 9 and a second display mounting plate 10, one end of the third connecting lever 8 is rotationally connected to the base 1, the other end of the third connecting lever 8 is rotationally connected to one end of the fourth connecting lever 9, and the other end of the fourth connecting lever 9 is rotationally connected to the second display mounting plate 10. The base is provided with a USB interface 5, an audio output interface 6 for connecting with earphones or a speaker, and an audio input interface 7 for connecting with a microphone.

In this configuration, two sets of display supports may be disposed on one base such that two displays can be supported simultaneously, which is suitable for a user who uses a host computer with two displays. Two USB interfaces also can be disposed on the base 1, and the two USB interfaces are connected to a same USB male connector through the principle of USB hub and connected to the host computer via the male connector. The number of USB interfaces may be expanded by employing such configuration to implement the functionality of USB hub.

The invention claimed is:

1. A flat panel display support, comprising:
   a base;
   a first connecting lever;
   a second connecting lever;
   a first display mounting plate;
   a third connecting lever;
   a fourth connecting lever; and
   a second display mounting plate,
   wherein
      a first end of the first connecting lever rotationally connects with the base,
      a second end of the first connecting lever rotationally connects with a first end the second connecting lever,
      a second end of the second connecting lever rotationally connects with the first display mounting plate,
      a first end of the third connecting lever rotationally connects with the base,
      a second end of the third connecting lever rotationally connects with a first end of the fourth connecting lever,
      a second end of the fourth connecting lever rotationally connects with the second display mounting plate, and
   wherein the base is provided with
      a USB interface on a sidewall of the base,
      an audio output interface for connecting with an earphone or a speaker,
      an audio input interface for connecting with a microphone,
      a first connecting wire,
      a plurality of second connecting wires,
         a USB male connector for connecting to the USB interface via the first connecting wire, and
         two plugs for connecting to the audio output interface and the audio input interface via the plurality of second connecting wires.

2. The flat panel display support according to claim 1, wherein the USB interface is one or more.

3. The flat panel display support according to claim 1, wherein the first display mounting plate, the USB interface, the audio output interface, and the audio input interface are provided on a same side of the flat panel display support.

4. The flat panel display support according to claim 1, wherein the first connecting lever and the third connecting lever are independently connected with the base.

5. The flat panel display support according to claim 1, wherein the base comprises the sidewall, a top side and a bottom side opposite the top side, the sidewall is between the top side and the bottom side, and the first connecting lever and the third connecting lever are connected with a top side of the base.

6. A flat panel display support, comprising:
   a base;
   a first connecting lever;
   a second connecting lever; and
   a first display mounting plate, wherein
      a first end of the first connecting lever rotationally connects with the base,
      a second end of the first connecting lever rotationally connects with a first end of the second connecting lever,
      the first end of the second connecting lever rotationally connects with the first display mounting plate, and
   the base is provided with a plurality of interfaces consisting of:
      at least one USB interface on a sidewall of the base,
      at least one audio output interface for connecting with an earphone or a speaker, and
      at least one audio input interface for connecting with a microphone.

7. The flat panel display support according to claim 6, wherein the mounting plate, the at least one USB interface, the at least one audio output interface, and the at least one audio input interface are provided on a same side of the flat panel display support.

\* \* \* \* \*